United States Patent [19]

Morris et al.

[11] Patent Number: 5,011,878

[45] Date of Patent: Apr. 30, 1991

[54] COPOLYESTERS FROM 4,4'-BIPHENYLDICARBOXYLIC ACID, 1,4-CYCLOHEXANEDIMETHANOL, AND 1,4-BUTANEDIOL

[75] Inventors: John C. Morris; Winston J. Jackson, Jr., both of Kingsport, Tenn.

[73] Assignee: Eastman Kodak Company, Rochester, N.Y.

[21] Appl. No.: 532,836

[22] Filed: Jun. 4, 1990

Related U.S. Application Data

[62] Division of Ser. No. 289,298, Dec. 23, 1988, Pat. No. 4,956,448.

[51] Int. Cl.$^5$ .................................................. C08K 5/49
[52] U.S. Cl. .................................... 524/115; 524/155; 524/284; 524/290; 524/341; 524/366; 524/408; 524/414; 524/420; 524/449; 524/451; 525/50; 525/88; 525/132; 525/149; 525/150; 525/153; 525/165; 525/185; 525/188; 525/189; 525/437; 525/439; 525/444
[58] Field of Search .................. 525/50, 88, 132, 149, 525/150, 153, 165, 185, 188, 189, 437, 439, 444; 528/272; 524/115, 155, 284, 290, 341, 366, 408, 414, 420, 449, 451

[56] References Cited

U.S. PATENT DOCUMENTS

| | | |
|---|---|---|
| 2,657,194 | 10/1958 | Butler et al. . |
| 2,976,266 | 3/1961 | Lytton et al. . |
| 3,030,335 | 4/1962 | Goldberg . |
| 3,190,764 | 6/1966 | Cardina . |
| 3,247,043 | 4/1966 | Cardina . |
| 3,317,466 | 5/1967 | Caldwell et al. . |
| 3,842,040 | 10/1974 | Browne et al. . |
| 3,842,041 | 10/1974 | Browne et al. . |
| 4,073,777 | 2/1978 | O'Neill et al. . |
| 4,728,717 | 3/1988 | Morris et al. . |
| 4,728,718 | 3/1988 | Morris et al. . |
| 4,728,719 | 3/1988 | Morris et al. . |
| 4,728,720 | 3/1988 | Morris et al. . |
| 4,739,033 | 4/1988 | Morris et al. . |
| 4,742,151 | 5/1988 | Tate et al. . |

*Primary Examiner*—John Kight, III
*Assistant Examiner*—Sam A. Acquah
*Attorney, Agent, or Firm*—Mark A. Montgomery; William P. Heath, Jr.

[57] ABSTRACT

Disclosed are copolyesters comprising an acid component of 4,4'-biphenyldicarboxylic acid and a glycol component comprising 1,4-cyclohexanedimethanol and 1,4-butanediol. The copolyesters exhibit unusually high tensile strengths.

11 Claims, No Drawings

COPOLYESTERS FROM 4,4'-BIPHENYLDICARBOXYLIC ACID, 1,4-CYCLOHEXANEDIMETHANOL, AND 1,4-BUTANEDIOL

This is a divisional of copending application Ser. No. 07/289,298 filed on Dec. 23, 1988, now U.S. Pat. No. 4,956,448.

FIELD OF INVENTION

The present invention concerns copolyesters from 4,4'-biphenyldicarboxylic acid, 1,4-cyclohexanedimethanol and 1,4-butanediol that have unusually high tensile strengths.

BACKGROUND OF THE INVENTION

Homopolyesters of 4,4'-biphenyldicarboxylic acid and certain aliphatic glycols are disclosed in the literature. Homopolyesters of 4,4'-biphenyldicarboxylic acid and ethylene glycol, 1,4-butanediol, and 1,6-hexanediol are disclosed by Meurisse et al., in the *British Polymer Journal*, Volume 13, page 57 (1981) (Table 1). Jackson and Morris include a review of homopolyesters from 4,4'-biphenyldicarboxylic acid and various aliphatic glycols in the *Journal of Applied Polymer Science, Applied Polymer Symposia*, 41, 307-326 (1985). Krigbaum et al., disclose relatively low molecular weight homopolyesters from 4,4'-biphenyldicarboxylic acid and various aliphatic glycols in the *Journal of Applied Polymer Science, Polymer Letters Edition*, 20, 109-115 (1982). Low molecular weight homopolyesters of 4,4'-biphenyldicarboxylic acid are also disclosed by Wanatabe et al., *Macromolecules*, 21(1), p. 278-280 (1988), and Krigbaum et al., *Polymer*, 24(10), p. 1299-1307 (1983). Jpn. Kokai Tokkyo Koho JP No. 61,236,821 [86,236,821] (1986) also discloses low molecular weight polyesters from 4,4'-biphenyldicarboxylic acid and 1,4-butanediol prepared below their melting temperatures in a nonvolatile liquid. Polyesters of 1,6-hexanediol and 4,4'-biphenyldicarboxylic acid are disclosed in *Kobunshi Ronbunshu*, Vol. 44(12), 983-986 (Dec. 1987) having limiting viscosity number of about 0.31.

U.S. Pat. No. 3,842,040 and U.S. Pat. No. 3,842,041 disclose the homopolyester of 4,4'-biphenyldicarboxylic acid and ethylene glycol.

U.S. Pat. No. 2,976,266 broadly discloses copolyesters prepared from 4,4'-biphenyldicarboxylic acid and neopentyl glycol and certain other aliphatic glycols. Copolyesters of 4,4'-biphenyldicarboxylic acid (BDA) and aliphatic glycols are disclosed using 1,4-butanediol (BD) but not 1,4-cyclohexanedimethanol (CD). BD is specifically mentioned in column 2, line 70 of U.S. Pat. No. 2,976,266 in a general listing along with other aliphatic glycols useful in this disclosed invention. The copolyester of BDA, CD, and BD is not specifically disclosed. In addition, the teaching of this patent in column 2, line 72, is that crystalline polymers prepared from BDA and aliphatic glycols are brittle.

German Offenlegungsschrift, DE No. 1935252, discloses polyesters of two aromatic dicarboxylic acids which include 10 to 50 mol % 4,4-biphenyldicarboxylic acid, 50 to 90 mol % of terephthalic acid and the two glycols ethylene glycol and 1,4-cyclohexanedimethanol.

Japanese patent, Kokai Tokkyo Koho JP No. 57/198726 discloses copolyesters containing 25-80 mol % 4,4'-biphenyldicarboxylic acid with various aliphatic glycols and aromatic dicarboxylic acids.

U.S. Pat. No. 4,742,151 discloses ultra-high-molecular weight polyesters prepared from aromatic dicarboxylic acids and alkylene glycols containing from 2 to 6 carbons having an intrinsic viscosity greater than 1.5. 4,4'-Biphenyldicarboxylic acid is disclosed in a list of dicarboxylic acids useful to the disclosed invention.

Heretofore, copolyesters of 4,4'-biphenyldicarboxylic acid, 1,4-cyclohexanedimethanol, and 1,4-butanediol have been unknown.

SUMMARY OF THE INVENTION

The present invention is directed to a copolyester comprising
  (A) an acid component comprising repeating units of at least 80 mol % 4,4'-biphenyldicarboxylic acid, and
  (B) a glycol component comprising repeating units of from about 95-20 mol % 1,4-butanediol, and about 5-80 mol % 1,4-cyclohexanedimethanol,
wherein the total mol % of acid component and glycol component are each 100 mol %.

The present invention is also directed to a composition comprising:
  (i) about 30 to 99 weight percent of the copolyester of the present invention and
  (ii) about 1 to 70 weight percent of at least one property modifier.

DETAILED DESCRIPTION OF THE INVENTION

The prior art describes molding, spinning, and film extrusion as viable processes for shaping the polyesters based on 4,4'-biphenyldicarboxylic acid. We have discovered a range of polyester compositions within this broad disclosure based on 4,4'-biphenyldicarboxylic acid, 1,4-cyclohexanedimethanol, and 1,4-butanediol having exceptionally high tensile strength.

Injection-molded bars comprising at least 80 mol % 4,4'-biphenyldicarboxylic acid units, 5 to 80 mol % 1,4-cyclohexanedimethanol units, and 95 to 20 mol % 1,4-butanediol units have surprisingly high tensile strength. The polyesters typically have inherent viscosities of at least about 0.6, but preferably about 0.8 or more. The homopolyester of 1,4-cyclohexanedimethanol in Table 1 has a tensile strength of 5,800 pounds per square inch (psi) and the homopolyester of 1,4-butanediol with BDA has a tensile strength of 6,300 psi. Modification of the homopolyester of BDA and 1,4-cyclohexanedimethanol with about 20 mol % of 1,4-butanediol about doubles the tensile strength. Likewise, modification of the homopolyester of BDA and 1,4-butanediol with about 5 mol % 1,4-cyclohexanedimethanol about doubles the tensile strength.

The polyesters of our invention also have excellent solvent resistance. Molded bars are substantially unaffected after exposure for 24 hours in a variety of solvents which include toluene, 1,2-dichloroethane, methyl isobutyl ketone, ethyl acetate, ethanol, water, sulfuric acid, 10% sodium hydroxide, gasoline, acetone, acetic acid, 5% Clorox bleach, 50/50 water/ethanol, benzyl alcohol, nitric acid and methylene chloride.

The copolyesters of this invention are prepared from 4,4'-biphenyldicarboxylic acid and/or its esters, 1,4-cyclohexanedimethanol and 1,4-butanediol. Examples of useful aromatic esters are the dimethyl, diethyl, dibutyl, and diphenyl esters or any combination of mixed esters. The polyesters may be prepared from glycol esters of BDA. The polyesters may be prepared in the melt or in the solid phase or by a combination of these processes.

In the copolyesters of the present invention it is preferred that the acid component is about 100 mol % of 4,4'-biphenyldicarboxylic acid.

It is also preferred that the glycol component is about 90-30 mol % 1,4-butanediol and about 10-70 mol % 1,4-cyclohexanedimethanol, more preferred is about 50 mol % 1,4-butanediol and about 50 mol % 1,4-cyclohexanedimethanol.

The BDA portion of the polyesters of the invention (component (A)) may be substituted with less than 20 mol %, but preferably, less than 10 mol % of other aromatic dicarboxylic acids having up to 20 carbon atoms. Examples of suitable aromatic dicarboxylic acids include terphthalic, isophthalic, 1,5-, 2,6-, 2,7-naphthalenedicarboxylic, or trans-4,4'-stilbenedicarboxylic acids.

Likewise, the glycol portion of the polyesters (component (B)) may be substituted with less than about 10 mol % of other aliphatic glycols having 2 to 20 carbon atoms so long as the high tensile strength remains substantially unaffected. Examples of useful glycols are ethylene glycol, 1,2-propanediol, 1,3-propanediol, 1,5-pentanediol, 1,6-hexanediol, and p-xylene glycol.

The copolyesters of the present invention preferably have tensile strengths of greater than 12,000 psi, more preferably greater than 20,000 psi.

In the composition of the present invention it is preferred that component (i) is present in an amount of about 50 to about 95 weight percent, and component (ii) is present in an amount of about 5 to about 50 weight percent.

In the composition of the present invention it is preferred that component (ii) is a property modifier selected from polyamides such as nylon 6,6 from Du Pont, poly(ether-imides) such as ULTEM, a poly(ether-imide) from General Electric, polyphenylene oxides such as poly(2,6-dimethylphenylene oxide) or poly(phenylene oxide)/polystyrene blends such as the NORYL resins from General Electric, polyesters, polyphenylene sulfides, polyphenylene sulfide/sulfones, poly(ester-carbonates), polycarbonates such as LEXAN, a polycarbonate from General Electric, polysulfones, polysulfone ethers, and poly(ether-ketones) of aromatic dihydroxy compounds. The aromatic dihydroxy compounds used to prepare these polymers are disclosed in U.S. Pat. Nos. 3,030,335 and 3,317,466.

Component (ii) of the composition of this invention may also be conventional flame retardants such as a phosphorus compound, a halogen compound, a halogen compound in combination with an antimony compound, or fillers such as talc or mica, or reinforcing agents such as glass fiber, KEVLAR a (poly(1,4-phenylene terephthalamide)), or carbon fiber.

It is preferred that the copolyester and/or composition of the present invention is in the form of a fiber, a film, a container, or a molded object.

The following examples are to illustrate the invention but should not be interpreted as a limitation thereon.

Inherent viscosities are determined at 25° C. in 25/35/40 (wt./wt./wt.) phenol/teterachloroethane/p-chlorophenol at a concentration of 0.1 gram (g)/100 milliliters (mL). The melting points are determined on a Perkin-Elmer DSC 2B Differential Scanning calorimeter at a scan rate of 20° C./minutes. Compositions are determined using proton nuclear magnetic resonance spectroscopy (NMR).

The polyesters are ground to pass a 3-millimeter (mm) screen, dried at 100° C. in a vacuum oven for 24 hours, and injection-molded on a 1-ounce (oz) Watson-Stillman plunger-type molding machine or a Boy 22S screw-type molding machine to give 1/16-inch (in.) thick D1822 Type L tensile bars. The tensile strength is determined following the procedure of ASTM D638.

EXAMPLE 1

This example illustrates the preparation of the copolyester consisting of 100 mol % 4,4'-biphenyldicarboxylic acid units, and 51 mol % 1,4-cyclohexanedimethanol units, and 49 mol % 1,4-butanediol units.

A mixture of 189.0 g (0.70 mol) dimethyl 4,4'-biphenyldicarboxylate, 86.4 g (0.42 mol) 1,4-cyclohexanedimethanol (70% in methanol), 63.0 g (0.70 mol) ethylene glycol, and 0.15 g titanium tetraisopropoxide is placed in a 1-liter flask equipped with an inlet for nitrogen, a metal stirrer, and a short distillation column. The flask is heated at 200° C. for about 1 hour, then at 220° C. for 0.5 hour, and then at 260° C. for 0.5 hour, and finally the temperature is raised to 300° C. and a vacuum of 0.5 mm is gradually applied over the next 5 minutes. Full vacuum is maintained for about 18 minutes. A high melt viscosity, white crystalline polymer is obtained with an inherent viscosity (I.V.) of 1.14 and a melting point of 280° C.

The polymers are injection molded at 260° C. to give tensile bars with 31.200 psi tensile strength.

The other examples in Table 1 are prepared and injection molded in a similar manner. The copolyestes of Table 1 have an acid component of 100 mol % BDA.

TABLE 1

Effect of Composition on the Tensile Strenth of 4,4'-Biphenyldicarboxylic Acid/1,4-Cyclohexanedimethanol/1.4-Butanediol Copolyesters

| CD, Mol % | BD Mol % | DSC, Tm, °C.[a] | Molding Temp. °C.[b] | Molding I.V. Before | Molding I.V. After | Tensile Strength, psi |
|---|---|---|---|---|---|---|
| 100[c] | 0 | 338 | 350 | 0.90 | 0.60 | 5800 |
| 85[c] | 15 | 313 | 340 | 0.85 | 0.77 | 6000 |
| 77 | 23 | 305 | 290 | 1.44 | 1.03 | 12200 |
| 71 | 29 | 298 | 270 | 1.16 | 0.92 | 13400 |
| 51 | 49 | 280 | 260 | 1.14 | 0.81 | 31200 |
| 27 | 73 | 259 | 250 | 1.48 | 0.70 | 35600 |
| 7 | 93 | 286 | 270 | 1.48 | 1.09 | 23000 |
| 0 | 100 | 295 | 280 | 1.14 | 0.80 | 6300 |
| 0[c] | 100 | 301 | 330 | 1.27 | 1.20 | 9800 |

[a]Melting Point in °C. as determined by Differential Scanning Calorimetry.
[b]The molding temperature is the set temperature of the last two zones of the Boy 22S injection molding machine. The actual melt temperatures are about 20-30° C. higher than the molding temperature.
[c]These polymers thermally degraded during molding on the Boy 22S molding machine. The polymers are molded on the Watson-Stillman molding machine to reduce thermal degradation problems. The molding temperature is the temperature of the barrel of the Watson-Stillman molding machine.

The invention has been described in detail with particular reference to preferred embodiments thereof, but it will be understood that variations and modifications can be effected within the spirit and scope of the invention.

What is claimed is:

1. A composition comprising:
   (i) about 30 to 99 weight percent of a copolyester comprising
      (A) an acid component comprising repeating units of at least 80 mol % 4,4'-biphenyldicarboxylic acid, and (B) a glycol component comprising repeating units of about 95-30 mol % 1,6-hexanediol, and about 5-70 mol % 1,4-cyclohexanedimethanol, wherein the total mol % of acid component and glycol component are each 100 mol %, and (ii) about 1 to 70 weight percent of at least one property modifier selected from 6,6-nylon, a poly(etherimide), a polyphenylene oxide, a polyphenylene oxide/polystyrene blend, a different polyester, a polyphenylene sulfide, a polyphenylene sulfide/sulfone blend, a poly(ester-carbonate), a polycarbonate, a polysulfono ether, a poly(ether-ketone) of aromatic dihydroxy compounds, a phosphorus compound, a halogen compound, a halogen compound in combination with an antimony compound, talc, mica, poly(1,4-phenylene terephthalamide), a glass fiber, and a carbon fiber.

2. The composition of claim 1 wherein
component (i) is present in an amount of about 50 to about 95 weight percent, and
component (ii) is present in an amount of about 5 to about 50 weight percent.

3. The composition of claim 1 wherein the acid component of the copolyester is about 100 mol % of 4,4'-biphenyldicarboxylic acid.

4. The composition of claim 1 wherein the glycol component of the copolyester is about 70-50 mol % 1,4-butanediol and about 50-70 mol % 1,4-cyclohexanedimethanol.

5. The composition of claim 3 wherein the glycol component of the copolyester is about 50 mol % 1,4-butanediol and about 50 mol % 1,4-cyclohexanedimethanol.

6. The composition of claim 1 wherein the copolyester has an inherent viscosity of at least about 0.6 determined at 25° C. in 25/35/40 (wt./wt./wt.) phenol/tetrachloroethane/p-chlorophenol at a concentration of 0.1 g/100 ml.

7. The composition of claim 1 wherein the copolyester has an inherent viscosity of at least about 0.8 determined at 25° C. in 25/35/40 (wt./wt./wt.) phenol/tetrachloroethane/p-chlorophenol at a concentration of 0.1 g./100 ml.

8. The composition of claim 1 wherein the acid component of the copolyester comprises at least about 90 mol % 4,4'-biphenyldicarboxylic acid and less than about 10 mol % of at least one other aromatic dicarboxylic acid having up to 20 carbon atoms; and the glycol component of the copolyester comprises less than about 10 mol % of at least one other aliphatic glycol having 2 to 20 carbon atoms.

9. The composition of claim 8 wherein said other dicarboxylic acid is terephthalic acid, isophthalic acid, 1,5-naphthalenedicarboxylic acid, 2,6-naphthalenedicarboxylic acid, 2,7-naphthalenedicarboxylic acid, or trans-4,4'-stilbenedicarboxylic acid; said other aliphatic glycol is 1,2-propanediol, ethylene glycol, 1,2-propanediol, 1,3-propanediol, 1,5-pentanediol, 1,6-hexanediol or p-xylene glycol.

10. The composition of claim 1 wherein the copolyester has a tensile strength of greater than 12,000 psi.

11. The composition of claim 1 wherein the copolyester has a tensile strength at greater than about 20,000 psi.

* * * * *

UNITED STATES PATENT AND TRADEMARK OFFICE
CERTIFICATE OF CORRECTION

PATENT NO. : 5,011,878

DATED : April 30, 1991

INVENTOR(S) : John C. Morris; Winston J. Jackson, Jr.

It is certified that error appears in the above-identified patent and that said Letters Patent is hereby corrected as shown below:

Col. 5, line 2 reads:

of about 95-30 mol % 1,6-hexanediol, and about

Col. 5, line 2 should read:

of about 95-20 mol % 1,4-butanediol, and about

Col. 5, line 3 reads:
5-70 mol % 1,4-cyclohexanedimethanol,

Col. 5, line 3 should read:

5-80 mol % 1,4-cyclohexanedimethanol,

Col. 5, line 13 reads:

bonate, a polysulfono ether, a poly(ether-ketone) of

Col. 5, line 13 should read:

bonate, a polysulfone ether, a poly(ether-ketone) of

Signed and Sealed this

Twenty-eighth Day of April, 1992

*Attest:*

HARRY F. MANBECK, JR.

*Attesting Officer*     *Commissioner of Patents and Trademarks*